United States Patent
Ritzau et al.

(10) Patent No.: US 8,191,055 B2
(45) Date of Patent: May 29, 2012

(54) METHOD AND SOFTWARE FOR OPTIMISING THE POSITIONING OF SOFTWARE FUNCTIONS IN A MEMORY

(75) Inventors: Tobias Ritzau, Veberod (SE); Rickard Moller, Lund (SE)

(73) Assignee: Sony Ericsson Mobile Communications AB, Lund (SE)

( * ) Notice: Subject to any disclaimer, the term of this patent is extended or adjusted under 35 U.S.C. 154(b) by 1073 days.

(21) Appl. No.: 12/065,221

(22) PCT Filed: Aug. 30, 2006

(86) PCT No.: PCT/EP2006/008492
§ 371 (c)(1),
(2), (4) Date: Apr. 21, 2008

(87) PCT Pub. No.: WO2007/025743
PCT Pub. Date: Mar. 8, 2007

(65) Prior Publication Data
US 2008/0196017 A1    Aug. 14, 2008

Related U.S. Application Data

(60) Provisional application No. 60/716,541, filed on Sep. 13, 2005.

(30) Foreign Application Priority Data

Aug. 30, 2005  (EP) ..................... 05018805

(51) Int. Cl.
*G06F 9/45*       (2006.01)
*G06F 9/44*       (2006.01)

(52) U.S. Cl. ............ 717/154; 717/151; 717/168
(58) Field of Classification Search ........... 717/151–156
See application file for complete search history.

(56) References Cited

U.S. PATENT DOCUMENTS 5,555,418 A  *  9/1996  Nilsson et al. ............... 717/153
(Continued)

FOREIGN PATENT DOCUMENTS

EP         0 459 192 A2    12/1991

OTHER PUBLICATIONS

Ogawa et al, "OMPI: Optimizing MPI program using aprtial evaluation", IEEE, pp. 1-18.*

(Continued)

*Primary Examiner* — Anil Khatri
(74) *Attorney, Agent, or Firm* — Myers Bigel Sibley & Sajovec

(57) ABSTRACT

The present invention is related to a method and a software program for optimizing the positioning of software functions in a memory of a computing device. The present invention hereby comprises the steps of identifying each of a number of software functions and the respective number of calls between the identified software functions; positioning the two software functions sharing the highest number of calls next to each other to form a group of software functions and updating the number of calls between the newly formed group and the other software functions, and repeating the positioning step and the updating step for the software functions and/or groups of software functions sharing the respective highest number of calls in the next calculation step and so forth until all software functions are positioned in a sequential order.

13 Claims, 3 Drawing Sheets

U.S. PATENT DOCUMENTS

| | | | |
|---|---|---|---|
| 5,579,520 A * | 11/1996 | Bennett | 717/151 |
| 5,724,590 A * | 3/1998 | Goettelmann et al. | 717/154 |
| 5,933,635 A * | 8/1999 | Holzle et al. | 717/151 |
| 6,367,077 B1 * | 4/2002 | Brodersen et al. | 717/170 |
| 6,425,125 B1 * | 7/2002 | Fries et al. | 717/168 |
| 6,487,715 B1 * | 11/2002 | Chamdani et al. | 717/154 |
| 6,839,895 B1 | 1/2005 | Ju et al. | |
| 6,848,100 B1 * | 1/2005 | Wu et al. | 717/157 |
| 6,925,467 B2 * | 8/2005 | Gu et al. | 707/687 |
| 6,930,109 B2 * | 8/2005 | Zhao et al. | 514/250 |
| 7,096,464 B1 * | 8/2006 | Weinmann | 717/169 |
| 7,219,342 B2 * | 5/2007 | Metzgen | 717/156 |
| 7,275,154 B2 * | 9/2007 | Butron | 713/100 |
| 7,290,253 B1 * | 10/2007 | Agesen | 717/154 |
| 7,293,264 B2 * | 11/2007 | Bicsak et al. | 717/156 |
| 7,426,724 B2 * | 9/2008 | Kilgard et al. | 717/151 |
| 7,523,448 B2 * | 4/2009 | Kawahito | 717/151 |
| 7,747,989 B1 * | 6/2010 | Kissell | 717/148 |
| 7,873,952 B2 * | 1/2011 | Shtilman et al. | 717/154 |
| 7,996,501 B2 * | 8/2011 | Eriksson et al. | 709/221 |
| 8,006,239 B2 * | 8/2011 | Sankaranarayanan et al. | 717/154 |
| 8,032,874 B1 * | 10/2011 | Keller et al. | 717/155 |
| 8,032,875 B2 * | 10/2011 | Kosche et al. | 717/158 |

OTHER PUBLICATIONS

Optimal loop unrolling and shifting for reconfigurable architectures, ACM Trans. on Reconfig. Tech & Sys. vol. 2, No. 4, article 25, pp. 1-24, 2009.*

Kakavade et al, "Hardware/Software partitioning for multi function systems", IEEE, pp. 516-521, 1997.*

Kempt et al, "Optimizing avatar environmental updates in shared virtual reality environments", ACM IMMERSCOM, pp. 1-6, 2007.*

IPER for PCT/EP2006/008492; Nov. 6, 2007.

Pettis, K et al: "Profile guided code positioning" SIGPLAN Notices USA, vol. 25, No. 6, Jun. 1990, pp. 16-27, XP002369561 ISSN: 0362-1340.

* cited by examiner

METHOD AND SOFTWARE FOR OPTIMISING THE POSITIONING OF SOFTWARE FUNCTIONS IN A MEMORY

RELATED APPLICATIONS

The present application is a 35 U.S.C. §371 national phase application of PCT International Application No. PCT/EP2006/008492, having an international filing date of Aug. 30, 2006 and claiming priority to European Patent Application No. 05018805.1 filed Aug. 30, 2005 and U.S. Provisional Application No. 60/716,541 filed Sep. 13, 2005, the disclosures of which are incorporated herein by reference in their entireties. The above PCT International Application was published in the English language and has International Publication No. WO 2007/025743.

TECHNICAL FIELD OF THE INVENTION

The present invention relates to a method for optimising the positioning of software functions in a memory of a computing device and a software program herefor. Many computing devices in which program or software code is executed and/or data of any kind are processed, a main storage medium for data, information, software code and so forth is used in combination with a working memory means, in which software code and/or information is stored while being worked on. The main storage means is e.g. a hard disk or the like, and the main working means is e.g. an RAM (Random Access Memory). On a hard disk, the stored software code and information remains stored even when a computing means is shut-off, while the RAM is cleared after computer shut-off. During the processing of data and/or the execution of software code, this processing is usually performed using the RAM, since an RAM allows the addressing of stored software code and information with the same speed at any location of the RAM.

DESCRIPTION OF RELATED ART

In any kind of computing device the situation may occur in which more RAM space is needed than available. Since a larger RAM is much more expensive than a smaller RAM, and the situation where more RAM space than available is necessary usually does not occur very often, the concept of a virtual memory has been introduced. The idea is basically that software code or data from the RAM are copied to a secondary memory to make room for other software code or data which are loaded back from the secondary memory. The secondary memory can hereby e.g. be the main storage means, such as the hard disk, of the computing device or any other suitable memory or storage device available within the computer device. The general concept of a virtual memory is visualised in FIG. 1. Hereby, the logical (or virtual) memory 1 has a larger storage space than the physical memory 2, which is e.g. the RAM. The applications 3a, 3b, 3c have address data in the logical memory 1 which are translated (address translation 4) into the "real" addresses of the data or software code in the physical memory 2. This translation of the address data or software is completely transparent to the applications.

As stated above, the virtual or logical memory 1 can be larger than the physical memory 2, whereby a secondary memory is used as a backup for data or software code which does not fit in the main working memory which is normally an RAM as mentioned.

The concept of a virtual memory can also be used to execute software code—virtually directly—from non-execution in place (XiP) devices such as NAND flash and hard drives, which means that the application or software code does not need to handle any loading from the secondary memory since this is automatically handled by the system code.

Generally, there are two main categories of virtual memory systems, namely paged systems in which the logical and physical memory is divided into equally sized pages, and segmented systems where the blocks have varying sizes. To simplify the understanding only the terminology of a paging system will be used in the following description, but it is intended that the present invention also applies to segmented systems.

If the logical or virtual memory space is larger than the physical memory space it might happen that a required page with required data or software code is accessed, which is not available in the physical memory. When this happens, a so-called page fault occurs. This is handled by the system and it starts by searching for an empty page in the logical memory. If no such empty page is found it selects a victim data or software code block to be unloaded. If the data in the victim page has been changed before due to some processing, it must be written back to the secondary memory in order to save the changes, otherwise it can simply be overwritten. The next step is to copy the required data or software code from the secondary memory to the main memory, i.e. the RAM, and to update the address translation data. Finally, the system returns the translated address data to the application which resumes execution with a slight delay.

The advantages of the virtual memory concept are a larger available memory space without the need to provide a larger physical memory device and the possibility to transparently execute applications from non-XiP memory. The disadvantage is the delay caused by the above described page faults. The number of page faults that occur is basically dependent on the size of the logical and the physical memory, the algorithm for selecting the victim page and the layout of data and code.

Several attempts exist in the prior art to decrease the rate of page faults by re-arranging software code in the secondary memory so that fewer page faults occur. E.g. K. Pettis, R. Hansen, 1990 "Profile Guided Code Positioning", in proceedings of the ACM SIGPLAN 1990 Conference on Programming Language Design and Implementation, ACM Press, suggested an algorithm which forms the reference standard in this area of technology. The approach suggested by Pettes and Hansen goes by the principle that "closest is best". In other words, software code or software functions that call each other often should end up positioned close to each other in the final version of the code. This increases the chance that they will be placed on the same RAM page (or segment), thus reducing the working set size and hereby reducing the number of page faults.

Pettis and Hansen hereby suggest to find an optimal order of software code or software functions on the basis of the number of calls between the code or software functions. Hereby, software codes or software functions with the highest number of calls between them are merged or combined first and thereafter the remaining software codes or software functions are combined with the formerly combined ones depending on their respective number of calls in decreasing order. Hereby, if two software codes or software functions are merged which each have a number of calls linking them to one other software code or software function, these number of calls are just summed up in order to update the number of calls between the newly combined software functions or software codes and the remaining software code or software function.

Finally, a list of software codes or software functions in a sequential order is obtained which is then stored in the secondary memory.

SUMMARY

The object of the present invention is to provide a method for optimising the positioning of software functions in a memory of a computing device with an increased efficiency and a decreased number of page faults as compared to the prior art.

The above object is achieved by a method for optimising the positioning of software functions in a memory of a computing device according to the enclosed claim 1. The method for optimising the positioning of software functions in a memory of a computing device according to the present invention comprises the steps of identifying each of a number of software functions and the respective number of calls between the identified software functions, positioning the two software functions sharing the highest number of calls next to each other to form a group of software functions and updating the number of calls between the newly formed group and the other software functions, and repeating the positioning step and the updating step for the software functions and/or groups of software functions sharing the respective highest number of calls in the next calculation round and so forth until all software functions are positioned in a sequential order, whereby said positioning step and said updating step are performed on the basis of the size of the software functions and the number of calls between the software functions.

It is to be noted that the term "software functions" used in the present application and claims is intended to comprise all kinds of software code, programming code, processing code, routines, sub-routines and functionalities and parts thereof which are used in computing devices to process data, information, instructions and/or the like. Further, the memory in which the software functions are placed with an optimised positioning according to the present invention is e.g. a secondary memory which works as a backup memory for a main working memory of a computing device, but can also be any kind of other memory in which an optimised positioning of software functions in the sense of the present invention is advantageous.

Further, the term "computing device" according to the present invention and claims is intended to comprise any kind of device which is able to process data, information, instructions and so forth in any kind of capacity, although it should be noted that an advantageous application of the present invention is in computing devices and electronic equipments of a small size in which the memory space is usually limited or in which it is advantageous to use small memory space because of cost considerations. E.g., the present invention could be applied in a portable radio communication equipment, which includes all equipment such as mobile telephones, pagers, communicators, i.e. electronic organisers, smartphones or the like which are able and adapted to communicate one- or bi-directionally in a wireless communication system.

Advantageously, in the step of updating the number of calls between newly formed groups of software functions and the other software functions or between newly formed groups of software functions and other groups of software functions, in case that the software functions of a newly formed group each shared a number of calls with one other software function or group of software functions, the updating step is performed on the basis of the size of the software functions of the newly formed group and of the one other software function or group of software functions. Hereby, advantageously, in said case that the software functions of a newly formed group each shared a number of calls with one other software functions or group of software functions, the updating step comprises a step of comparing the size of a window reflecting the size of segments of said memory with the size of said software functions of the newly formed group and of said one other software function or group of software functions. Hereby, advantageously, as result of said comparing step, selected adjacent software functions of said software functions of the newly formed group and/or of said one other software function or group of software functions are used which have an added size which is smaller than said size of said window. Hereby, advantageously, the updated number of calls is calculated on the basis of the calls shared between the software functions which are adjacent to said selected adjacent software functions of said software functions of the newly formed group and of said one other software function or group of software functions which have an added size that is smaller than said size of said window, whereby the number of calls shared within a group of selected software functions is not used in said calculation step.

Further advantageously, the step of positioning a group of software functions and a software function or a group of software functions and another group of software functions next to each other to form a new group of software functions comprises the step of comparing the size of a window reflecting the size of segments of said memory with the size of said software functions in said group(s) of software functions or said software functions which are to be positioned next to each other. Hereby, advantageously, as a result of said comparing step only selected adjacent software functions of said software functions of the newly formed group and or said one other software function or group of software functions are used in said positioning step which have an added size which is smaller than said size of said window. Hereby, advantageously, the software functions to be positioned next to each other are determined on the basis of the calls shared between the software functions which are adjacent to said selected adjacent software functions of said group(s) of software functions which have an added size which is smaller than said size of said window, whereby the number of calls shared within a group of software functions is not used in said determination step.

The present invention is further directed to a software program or a computer program for optimising the positioning of software functions in a memory of a computing device, said software program or computer program being adapted to perform a method according to the present invention if loaded into a memory of the computing device and run on the computing device.

BRIEF DESCRIPTION OF THE DRAWINGS

In the following description, the present invention is explained in more detail in relation to the enclosed drawings, in which FIG. 1 schematically shows the concept of virtual memory, FIG. 2 schematically shows a computing device with a central processing unit and main memory and a secondary memory, FIG. 3 schematically shows an example of a software code layout in a secondary memory achieved according to the present invention as compared to a prior art one, FIG. 4 schematically shows an undirected weighted call graph of software functions to be placed in an optimised order according to the present invention, FIG. 5 schematically shows the call graph of FIG. 4 after four iteration steps, FIGS. 6a to 6e schematically show the application of a window function in order to update calls between software functions during the application of the inventive method, and FIG. 7 schematically shows the final sequential order of the software functions of the call graph of FIG. 4.

DETAILED DESCRIPTION OF EMBODIMENT

Figure 1:
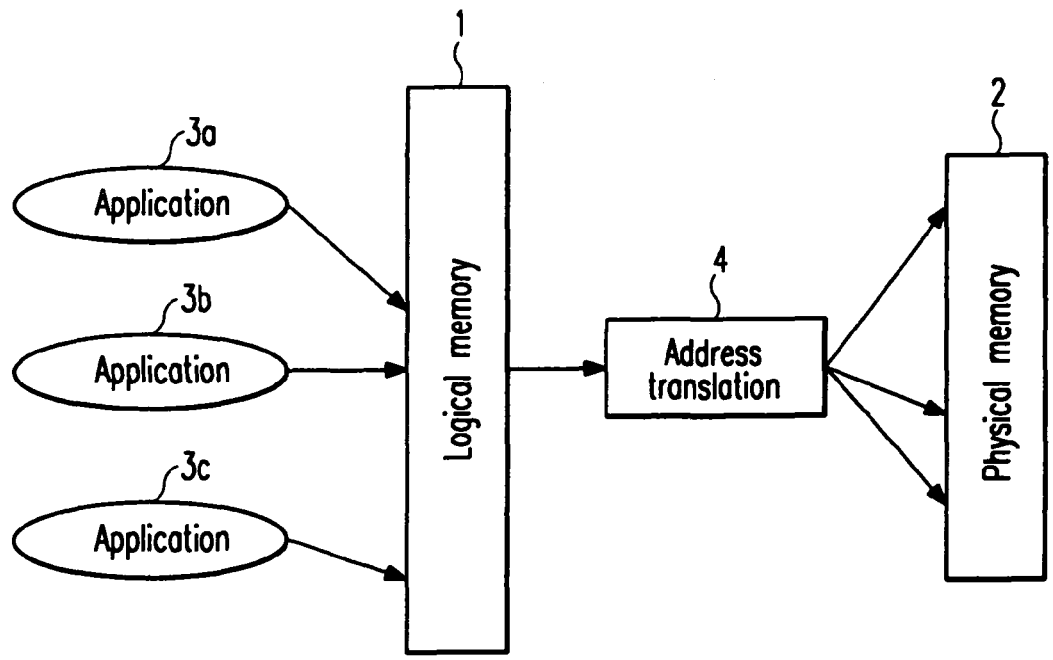
Figure 2:
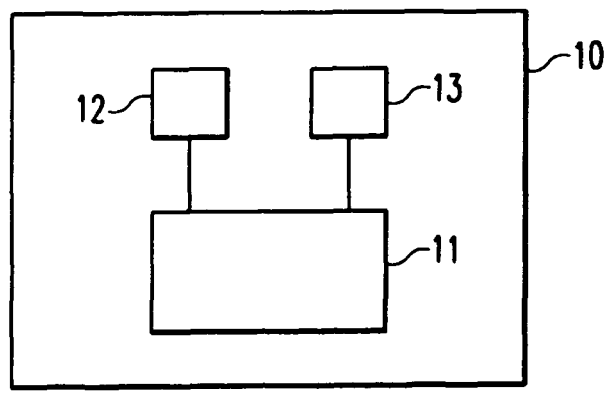

In FIG. 2, a block diagram of a computing device 10 comprising a central processing unit 11 as well as a main memory 12 and a secondary memory 13 is shown. As stated above, the computing device 12 may be any kind of portable or non-portable computing device which is able and adapted to process data, information, instructions or the like in the central processing unit 11 by using the main memory 12 and the secondary memory 13. The main memory 12 is e.g. a main working memory, such as an RAM, whereas the secondary memory 13 is e.g. a hard disk or any other kind of memory or storage device. A method for optimising the positioning of software functions of the present invention will typically be applied by a processing unit, such as the central processing unit 11 in order to store software functions in a memory of the computing device, such as a secondary memory 13. E.g., if the main memory 12 is fully occupied, and additional software functions have to be stored in order to be processed by the processing unit, these additional software functions have to be stored in the secondary memory 13. Since the secondary memory 13 is usually not an RAM memory in which every address can be accessed with the same speed, the storage order of the software functions has to be optimised. The method according to the present invention provides this optimisation.

Figure 3:
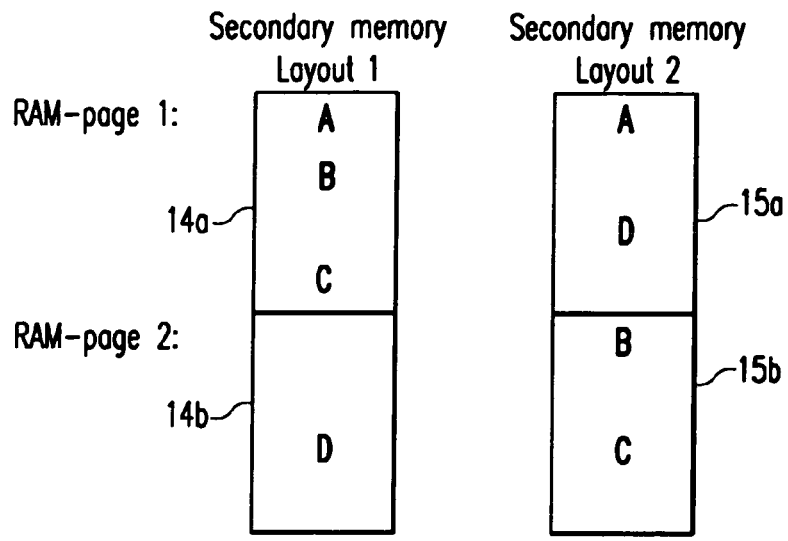

FIG. 3 shows a comparison of a storage layout of the prior art in comparison to the storage layout which can be achieved by the method according to the present invention. Hereby, the left side of FIG. 3 shows as layout 1 a first page 14a and a second page 14b of software functions A, B, C and D which have been stored according to a prior art method. Hereby, it is to be noted that the division and the storing of the software functions in pages corresponds to the page system described further above, in which the logical and physical memory (i.e. the RAM) is divided into equally sized pages. However, the described example identically relates to segmented systems also, in which the storage sections or blocks have varying sizes. In the claim language used in the present application, the term "segments" is used which comprises pages, segments, sections of fixed and varying sizes used to store data code and so forth in a memory of a computing device.

Returning to the example of FIG. 3, it is assumed that the function A is of a type which during the processing calls the software function D three times and then calls the software function B once before the processing is ended. The software function B is of a type which calls the software function C twice before the processing is finished. The software functions C and D do not call any other software function during processing. Therefore, if the execution starts with the software function A, the central processing unit, e.g. the central processing unit 11, demands software code from the software function in the order ADADADABCBCBA. Assuming that only a very small main working memory 12 is available, such as a very small RAM which only has one RAM page which is full. If the software functions A, B, C, D are placed in pages 14a and 14b of the secondary memory as shown in FIG. 3 on the left side, the accessing of the software functions during execution will result in 11 page faults and a correspondingly increased processing time. In FIG. 3 on the right side, a layout of the same software functions A, B, C and D is shown which is achieved by the method according to the present invention. In contrary to the left side of FIG. 3, in which the software functions are stored in an alphabetical order, applying the method of the present invention would have resulted in storing the software functions A and D on the first page 15a and the software functions B and C on the second page 15b. During execution starting with software function A, the positioning achieved by the present invention would only result in 3 page faults. This shows that the method for optimising the positioning of software functions in a memory of a computing device according to the present invention has significant processing power and processing time advantages over the prior art. Generally, the method of the present invention decreases the rate of page faults by typically 20 to 40% as compared to prior art solutions. Since the rate of page faults is decreased, the execution speed can be increased, the size of the logical memory space can be increased and/or the size of the main memory can be decreased.

Figure 4:
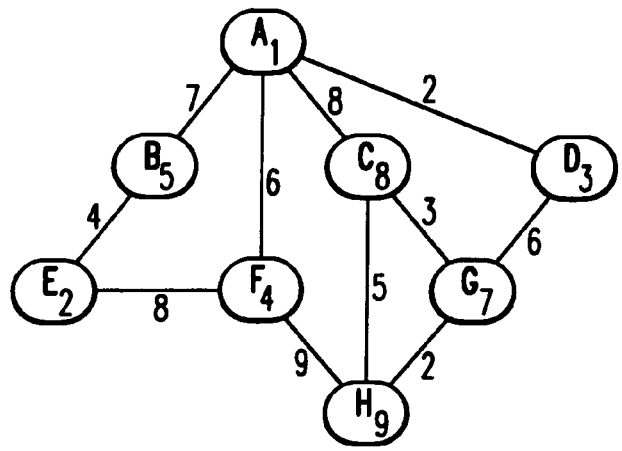

At the beginning of the method for optimising the positioning of software functions in a memory of a computing device according to the present invention, an undirected weighted call graph is built as shown in FIG. 4. Hereby, profiling data of the software functions, i.e. information about the size of each software function as well as information about the number of calls between the software functions is used to built the call graph. In the example shown in FIG. 4, software function A has a size of 1, software function B has a size of 5, software function C has a size of 8, software function D has a size of 3, software function E has a size of 2, software function F has a size of 4, software function G has a size of 7 and software function H has a size of 9. The number of calls between the software functions A and B is 7, between software functions A and F is 6, between software functions A and C is 8 and between software functions A and D is 2. The number of calls between software functions E and B is 4 and between the software functions E and F is 8. The number of calls between the software functions G and C is 3 and between the software functions G and D is 6. The number of calls between the software functions H and F is 9 and between the software functions H and G is 2. The number of calls between software functions C and H is 5. In the call graph of FIG. 4, each software function A, B, C, D, E, F, G and H is represented as a node, whereby the edges between the nodes correspond to calls between the respective software functions and the weights of the edges corresponds to the sum of the number of calls made between the connected software functions. Hereby, calls made from one software function to itself (recursion) do not count.

For extracting the profiling information, i.e. the size of the software functions and number of calls between the software functions from a running system, any suitable way or method can be applied. One possibility is to insert code into the start and end of software functions at an assembly code level. This extra code can be adapted to write the current physical address to a specific super-global variable. Also, the current process identification should be written to another variable. The writing into these variables could then be recorded by a logic analyser. The recorded list of addresses can then be mapped against the software function involved by use of a map-file. A map-file is essentially a list of the linked software functions with start and end addresses for each software function. A call-tree can then be produced for each process. As a next step, the information about how many times each software function called another specific software function can be extracted. These data can then be used to build a weighted call graph as e.g. shown in FIG. 4. In order to verify the results of the profiling, logs could be made from a system which runs without profiling by also using a logic analyser. The produced logs are a list of physical addresses of executing code that was transferred between the memory and the central processing unit. Then, the demand paging environment could be simulated, whereby the simulator could go through the logs and output the number of page faults encountered. In order to simulate the rearranging of software functions according to the present invention, this simulation can be done on the original log and on the same log with changed addresses.

As stated above, the method for optimising the positioning of software functions according to the present invention starts from a situation as visualised by FIG. 4, in which information about the size of every software function as well as the number of calls between the various software functions to be ordered and positioned in the secondary memory is available. This situation is visualised by the undirected weighted call graph in FIG. 4. The first step is then to join the respective software functions which share the highest number of calls. In the example shown in FIG. 4, the software functions F and H would be joined in a first step in order to form a new group of software functions FH. In the graph representation, a new node FH would be formed.

At the same time, the number of the calls connecting the newly formed group of software functions, in this example F and H, exchanged with the remaining software functions is updated. In the present example, after combining the software functions F and H, the number of calls exchanged with the software functions E, A, C and G, respectively, remain the same, since the software functions F and H did not exchange calls with one (the same) other software function.

Figures 6A, 6B, 6C, 6D, 6E, 7:
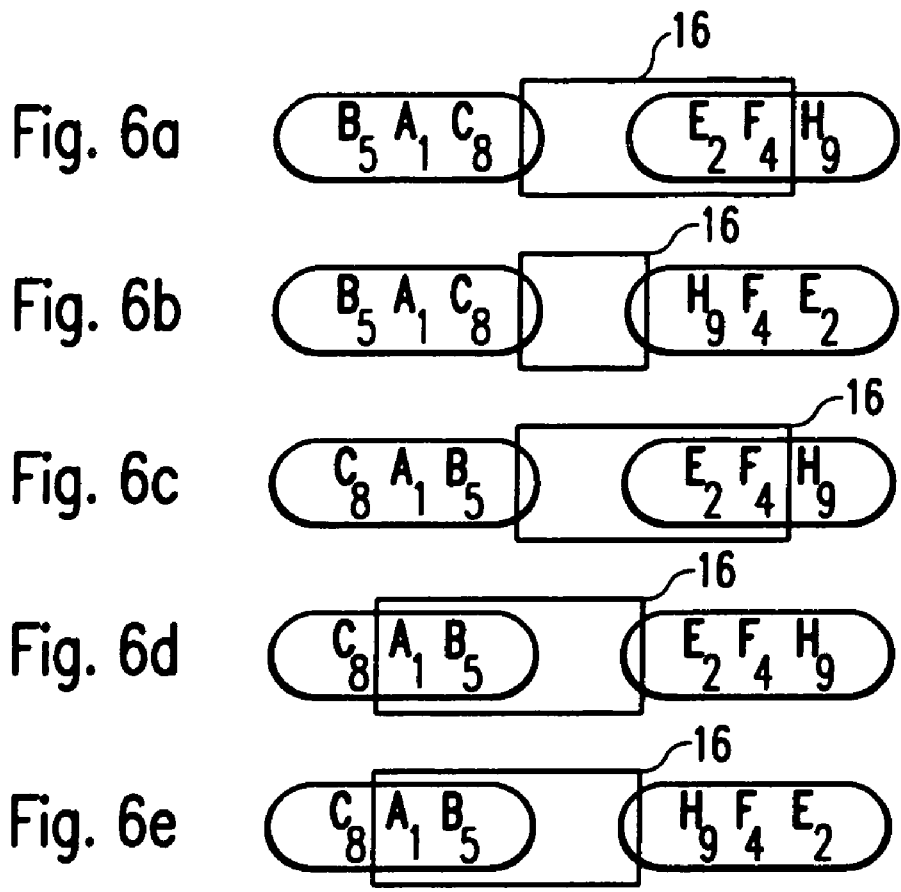

The combining of software functions or positioning of software functions next to each other and updating the calls exchanged with the remaining software functions (or group of software functions) is continued step by step starting with the software functions (or group of software functions) sharing the highest number of calls, the respective highest number of calls, for the next calculation round and so forth until the software functions are positioned next to each other in a sequentially ordered list, as e.g. shown in FIG. 7. It is to be noted, that if e.g. in the first step, there are two or more edges having the same highest number of calls between software functions, one of them is randomly chosen, and in the next step the next one is randomly chosen. E.g., in the second step of the example of FIG. 4, after combining the software functions F and H in the first step, the highest number of calls remaining is 8, which occurs twice, namely between the software functions A and C and between the software functions E and the newly formed group FH. Then, the next combination is randomly chosen. E.g., if the software function E is joined to the group FH in the second step, then the software functions A and C are joined in the third step. In the second step of the example (joining E to the group FH), the updating of the calls which are shared with other software functions (or group of software functions) is simple because the software function E and the group FH did not share calls with the same software function or group of software functions. This changes when the software functions A and C are linked together in the third step. Here, software function F exchanges 5 calls with software function H and software function A exchanges 6 calls with software function F. Thus, after combining software function A and C to a newly formed group AC, the number of calls between the newly formed group AC and the (old) group EFH has to be updated and re-calculated. The exact algorithm will be explained in relation to the sixth step, in which the software function B is joined to the newly formed group AC. Generally, the updating calculation for calls does not just sum up the calls between the two (groups of) software functions to be joined, but selects the calls to be summed up depending on the location of the respective software function within the group. Hereby, the updating algorithm according to the present invention mainly considers the number of calls between software functions which are located on the sides of an already formed group of software functions. These sides or the size of these sides is defined as a so-called window which has a maximum size of one page (or one segment) of the memory in which the software functions are to be stored. It is to be noted that an updated number of calls may exceed the initially highest number of calls.

In the fourth step, the highest number of calls between the software functions A and B determines that the software function B is joined to the newly formed group AC. Since the software function B shares 4 calls with the software function E which is part of the group EFH, and the software function C (being part of the group AC) and the software function H (being part of the group EFH) share 5 calls. Therefore, when merging the groups BAC and EFH the number of calls between these two groups has to be updated.

Figure 5:
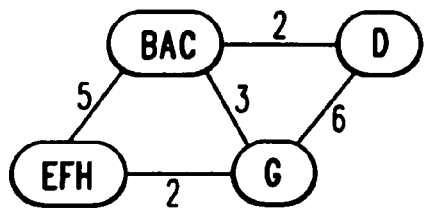

FIG. 5 hereby shows the result of the updating calculation, namely that the groups BAC and EFH share 5 calls. FIGS. 6a to 6e help to understand how this updated number of calls is calculated.

As stated further above, in a case where software functions or group of software functions are joined which do not share calls with one other software function (or one other group of software functions), there is no need to calculate an updated number of calls. However, in a case where software functions and/or groups of software functions are joined which share calls with one other software function or one other group of software functions, it is necessary to perform a calculation in order to obtain an updated number of calls. Generally, in such a case the updating calculation is performed on the basis of the size of the software functions and the number of calls between the software functions which are involved. Hereby, mainly the software functions which are located on the sides, but not somewhere in the middle, of the concerned (to be joined) groups of software functions are used as a basis for the calculation. Calls between software functions in the middle of the respective groups are almost never used. Hereby, a so-called window is used. The size of the window is equal or smaller to the size of a page or a segment of the memory in which the software functions are to be stored. Advantageously, the window size is smaller than a corresponding page or segment size. In the example used in FIGS. 6a to 6e, the assumed page size is 8 and the window size is 2 less than the page size, i.e. 6. The groups BAC and EFH can be connected in four ways, namely BAC-EFH, BAC-HFE, CAB-EFH or CAB-HFE. This means that there are at least four different ways to place the window. Often there are more ways like in the case CAB-EFH, where two different windows can be placed. FIG. 6a shows the case for BAC-EFH, where the window 16 (having a size of 6) is placed over the software functions E and F, which have an added size of 6. In FIG. 6b, which shows the example BAC-HFE, the window 16 (having a size of 6) can be placed over any neighbouring functions of both groups and is therefore placed in the middle. In FIG. 6c which shows the example CAB-EFH, the window 16 (having a size of 6) is also placed over the software functions E and F which have an added size of 6. In FIG. 6d, which shows the second possibility for CAB-EFH, the window 16 is placed over the software functions A and B, which have an added size of 6. In FIG. 6e, which shows the example CAB-HFE, the window 16 is also placed over the software functions A and B. Therefore, the window is always placed over two or more software functions on a side of one of the groups to be joined where the combined sizes of the software functions is smaller or equal the window size. Also, the window could be placed over one or more software functions from one group and one or more software function from another group at the same time, whereby the combined size of the software functions is smaller or equal the window size. If these two options are possible, the window is placed in the middle between the two groups, as shown in FIG. 6b.

In order to arrive at the updated call number, for each of the possible connections between the two groups of software functions to be joined, the sums of the calls for the combination of the software functions within the window and just outside (immediately adjacent to) the window is calculated. Hereby, the calls between software functions within the one group are not used. Thus, in FIG. 6a the calls between the software functions CE, CF and CH are calculated, which gives (0+0+5) a sum of 5. In FIG. 6b, only the number of calls between the software functions CH is calculated, resulting in 5 calls. In the example of FIG. 6c, the sum of the calls between the software functions BE, BF and BH is calculated, which results in (4+0+0=) 4 calls. In the example of FIG. 6d, the sum of the calls between the software functions CE, AE and BE is calculated, which results in a number (0+0+4=) 4 calls. In the example of FIG. 6e, the sum of the number of calls between the software functions CH, AH and BH is calculated, which results in a number of (5+0+0=) 5 calls. Afterwards, the maximum result is chosen to be the new and updated number of calls between the groups of software functions. In the present case, the result of 5 calls has been achieved 3 times, so that the result is 5 calls. It has to be noted that the software functions which are in the middle of groups to be joined are only rarely used for the calculation of the updated number of calls. In the present example, the number of calls between the software functions A and F, which is 6, is not used, since the software function A is hidden between C and B and the software function F is hidden between the software functions E and H. Thus, A and F could never end up on the same page or segment of the memory anyway.

It is to be noted that the question in which order one software function is joined to a group of software functions or in which two groups of software functions are actually linked together is determined in the identical way as the determination of the updated number of calls. Returning to the examples of FIGS. 6a to 6e, the highest result for the added number of calls between the software functions has been achieved by the possible links of FIGS. 6a, 6b and 6e. In case that there is not a singular highest result but a number of highest results, one of the results is randomly chosen. In the example the possibility of FIG. 6b is randomly chosen, so that the groups BAC and HFE are linked together to a new group BACHFE in the sixth step. Beforehand, in a fifth step, the two software functions D and G sharing the fourth highest number of calls (6 calls) were linked together to a new group DG.

It is further to be noted that when calculating the updated number of calls, the sum of software functions belonging to the same group is never used, so that e.g. in FIG. 6a the combinations HF and HE are not considered. Similarly, in FIGS. 6d and 6e the combinations CA and CB are not considered. In other words, the combination and the summation of calls between software functions is performed only on the basis of calls between software functions which belong to different groups or nodes.

In the sixth step, the group DG is linked to the group BACHFE. The result of this combination is shown in FIG. 7.

When linking the group DG to the group BACHFE the same algorithm as explained in relation to FIGS. 6a to 6e is applied. Hereby, if the window is placed over the software functions BA, the possibilities to join DG and GD have to be compared. Here, the combination DG achieves the result of 3 calls. On the other side of the group BACHFE the window can be placed over the software functions FE and the two possibilities are again DG and GD. Here, the possibility DG results in 0 calls and the possibility GD results in 2 calls, so that the highest result of 3 calls leads to the decision that the group DG in this order is joined to the group BACHFE, so that the resulting group of software functions in a sequential order is DGBACHFE as shown in FIG. 7. This final group of software functions is then stored in the secondary memory.

With the method for optimising the positioning of software functions, a decrease of 20 to 40% in the number of page faults can be achieved. In terms of the size of an RAM, this indicates that a system running smoothly on 5 MB of RAM could be able to equally smooth on 4 MB of RAM when the method of the present invention is used. It is to be noted that the method according to the present invention is advantageously realised in a software program or computer program which is adapted to perform the above-described method steps if loaded in a memory of a computing device.

The invention claimed is:

1. A method for optimizing the positioning of software functions in a memory of a computing device, the method comprising:

identifying each of a plurality of software functions and a respective quantity of calls between the identified software functions;

positioning two of the plurality of identified software functions sharing a highest quantity of calls next to each other in the memory to form a defined group of software functions, the quantity of calls between a first software function and a second software function of the plurality of software functions respectively representing a quantity of times the first software function calls the second software function when the first software function is executed;

updating a quantity of calls between a newly formed group and other of the plurality of software functions, the updating comprising selecting calls of software functions included in the newly formed group based on locations of the software functions in the newly formed group; and comparing a size of a window reflecting a size of segments of the memory with a size of the plurality of software functions of the newly formed group and of another of the plurality software functions or group of software functions, repeating the positioning and the updating for the plurality of software functions and/or defined groups of software functions sharing successively next highest quantity of calls in a next calculation round until all of the plurality of software functions are stored in a sequential order in the memory, wherein the positioning and the updating are performed on the basis of the size of the plurality of software functions and the quantity of calls between the plurality of software functions, wherein in response to the software functions of the newly formed group sharing a quantity of calls with another of the plurality of software functions or defined groups of software functions, updating the quantity of calls between newly formed group of software functions and other of the plurality of software functions or between newly formed groups of software functions and other groups of software functions is performed on the basis of a size of the software functions of the newly formed group and on the basis of another of the plurality of software functions or group of software functions, and wherein at least one of identifying, positioning, and updating is performed using at least one processor.

2. The method according to claim 1, wherein the comparing causes selected adjacent ones of the plurality of software functions of the newly formed group and/or of another one of the plurality of software functions or group of software functions to have an added size that is smaller than the size of the window.

3. The method according to claim 2, wherein the updated quantity of calls is calculated on the basis of the calls shared between software functions that are adjacent to the selected adjacent ones of the plurality of software functions of the newly formed group and another one of the plurality of software functions or group of software functions that have an added size that is smaller than the size of the window, wherein the quantity of calls shared within a group of the plurality of software functions is not used in the calculation.

4. The method according to claim 1, wherein positioning the group of software functions and one of the plurality of software functions or the group of software functions and another group of software functions next to each other to form a new group of software functions comprises comparing a size of a window reflecting a size of segments of the memory with a size of the software functions in the group(s) of software functions or the software functions that are to be positioned adjacent each other.

5. The method according to claim 4, wherein the comparing causes selected adjacent ones of the plurality of software functions of the newly formed group and of another of the plurality of software functions or defined group of software functions that have an added size that is smaller than the size of the window to be used in positioning.

6. The method according to claim 5, wherein the ones of the plurality of software functions to be positioned adjacent one another are determined on the basis of calls shared between the plurality of software functions that are adjacent the selected adjacent software functions of the group(s) of software functions that have an added size that is smaller than the size of the window, wherein the quantity of calls shared within a group of software functions is not used in the determination.

7. A computer program product for optimizing the positioning of software functions in a memory of a computing device, the software program product configured to operate according to the method of claim 1.

8. A method for optimizing the positioning of software functions in a memory of a computing device, comprising:
  identifying a plurality of call quantities corresponding to a plurality of software functions;
  defining a first group of software functions as two of the plurality of software functions that include two of the highest of the plurality of call quantities, a first portion of software functions including undefined ones of the plurality of software functions, the call quantities between a first software function and a second software function of the plurality of software functions respectively representing a quantity of times the first software function calls the second software function when the first software function is executed;
  positioning the first group of software functions in a first memory location;
  updating a quantity of calls between the first group of software functions and the first portion of software functions;
  defining a second group of software functions as two of the first portion of software functions that include two of the highest of the plurality of call quantities of the first portion of software functions, a second portion of software functions including undefined ones of the first portion of software functions;
  positioning the second group of software functions in a second memory location that is adjacent the first memory location;
  updating a quantity of calls between the second group of software functions and the second portion of software functions; and comparing a size of a window reflecting a size of segments of the memory with a size of the plurality of software functions of the newly formed group and of another of the plurality software functions or group of software functions;
  repeating the defining, the positioning, and the updating for the second portion of the software functions and for subsequent groups and/or portions of the software functions until the plurality of software functions are stored in a sequential order in the memory,
  wherein at least one of identifying, defining the first group, positioning the first group, updating the quantity of calls, defining the second group, and positioning the second group is performed using at least one processor.

9. The method of claim 8, wherein repeating comprises repeating the defining, the positioning and the updating on the basis of the size of the each of the plurality of software functions.

10. The method of claim 8, wherein repeating comprises repeating the defining, the positioning and the updating on the basis of the quantity of calls between the plurality of software functions.

11. The method of claim 8, wherein subsequent groups comprise one of the plurality of software functions and a previously defined group.

12. The method of claim 8, wherein repeating comprises repeating until all of the plurality of software functions are positioned in a sequential order in memory.

13. The method of claim 8, further comprising selecting adjacent ones of the defined group of software functions and/or the another one of the plurality of software functions or previously defined groups of software functions to include an added size that is smaller than the size of the window.

* * * * *